US012633605B2

(12) United States Patent
Rustomji et al.

(10) Patent No.: US 12,633,605 B2
(45) Date of Patent: May 19, 2026

(54) HIGH AMBIENT PRESSURE TOLERANT BATTERY CELL

(71) Applicant: SOUTH 8 TECHNOLOGIES, INC., San Diego, CA (US)

(72) Inventors: Cyrus S. Rustomji, San Diego, CA (US); Elena Machado, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 18/788,809

(22) Filed: Jul. 30, 2024

(65) Prior Publication Data

US 2026/0038921 A1    Feb. 5, 2026

(51) Int. Cl.
| | |
|---|---|
| *H01M 50/184* | (2021.01) |
| *H01G 11/18* | (2013.01) |
| *H01G 11/80* | (2013.01) |
| *H01M 50/107* | (2021.01) |
| *H01M 50/186* | (2021.01) |

(52) U.S. Cl.
CPC .......... *H01M 50/184* (2021.01); *H01G 11/18* (2013.01); *H01G 11/80* (2013.01); *H01M 50/107* (2021.01); *H01M 50/186* (2021.01); *H01M 2300/0028* (2013.01); *H01M 2300/0034* (2013.01)

(58) Field of Classification Search
CPC ............. H01M 50/184; H01M 50/107; H01M 50/186; H01M 2300/0028; H01M 2300/0034; H01M 50/375; H01G 11/18; H01G 11/80

See application file for complete search history.

(56) References Cited

U.S. PATENT DOCUMENTS

| | | | | |
|---|---|---|---|---|
| 3,514,341 | A | * 5/1970 | Cook | .................... F16K 15/142 |
| | | | | 429/6 |
| 2009/0142655 | A1 | 6/2009 | West | |
| 2012/0070700 | A1 * | 3/2012 | Kerkamm | ............. H01M 10/42 |
| | | | | 429/7 |
| 2013/0280640 | A1 | 10/2013 | O'Neill | |
| 2013/0323545 | A1 | 12/2013 | Gless | |

(Continued)

FOREIGN PATENT DOCUMENTS

| | | | | |
|---|---|---|---|---|
| DE | 102023203561 | A1 * | 2/2024 | ......... H01M 10/052 |
| JP | 2001185111 | | 7/2001 | |

OTHER PUBLICATIONS

International Search Report for PCT/US2024/040203, dated Feb. 7, 2025, 14 pages.

*Primary Examiner* — Ula C Ruddock
*Assistant Examiner* — Olivia Mason Ruggiero
(74) *Attorney, Agent, or Firm* — Manuel de la Cerra

(57) ABSTRACT

Disclosed herein is a design for an electrochemical energy-storage cell that can withstand high-pressure environments. The cell has a gas-tight cell housing that encloses an electrolyte in contact with an electrode assembly. The cell housing defines a cell volume. A pressure-equalizing member is connected to the cell housing and constructed to displace a portion of the cell volume to equalize a pressure differential between an external pressure on the cell and an interior pressure of the cell. The electrolyte remains in a liquid or gas phase when the pressure-equalizing member displaces the portion of the cell volume and equalizes the pressure differential.

22 Claims, 9 Drawing Sheets

(56) References Cited

U.S. PATENT DOCUMENTS

| | | | |
|---|---|---|---|
| 2016/0226040 A1* | 8/2016 | Mongeau | H01M 50/209 |
| 2017/0338532 A1* | 11/2017 | Mott | H01M 10/659 |
| 2020/0067032 A1* | 2/2020 | Davies | H01M 50/184 |
| 2021/0265697 A1* | 8/2021 | Nakayama | H01M 50/325 |
| 2021/0320354 A1* | 10/2021 | Zhu | H01M 10/0525 |
| 2022/0399610 A1* | 12/2022 | Bueschges | H01M 10/613 |
| 2023/0175602 A1 | 6/2023 | Elringklinger | |
| 2023/0178755 A1* | 6/2023 | Richey | H01M 50/193 |
| | | | 429/146 |
| 2023/0246286 A1* | 8/2023 | Rustomji | H01G 11/18 |
| | | | 429/54 |
| 2023/0268578 A1* | 8/2023 | Gao | H01M 10/6568 |
| | | | 429/62 |

* cited by examiner

37

37

37

HIGH AMBIENT PRESSURE TOLERANT BATTERY CELL

CROSS-REFERENCE TO RELATED APPLICATIONS

This application is related to the following applications and patents, each of which is hereby incorporated by reference in its entirety: U.S. Pat. No. 10,608,284 issued on Mar. 31, 1920; U.S. Pat. No. 10,998,143 issued on May 4, 1921; U.S. Pat. No. 10,784,532 issued on Sep. 22, 1920; U.S. Pat. No. 11,088,396 issued Aug. 10, 1921; U.S. Pat. No. 10,873, 070 issued on Dec. 22, 2020; U.S. Pat. No. 11,342,615 issued on May 24, 1922; U.S. Pat. No. 11,049,668 issued on Jun. 29, 1921; U.S. Pat. No. 11,984,614 issued on May 14, 1924; U.S. Pat. No. 11,958,679 issued on Apr. 16, 1924; PCT/US22/31594 filed on May 31, 1922; PCT/US23/17720 filed on Apr. 6, 2023; PCT/US23/28104 filed on Jul. 19, 1923; PCT/US23/28105 filed on Jul. 19, 1923; PCT/US24/ 16784 filed on Feb. 21, 1924; PCT/US24/18746 filed on Mar. 6, 1924; PCT/US24/33428 filed on Jun. 11, 1924; PCT/US24/25771 filed on Apr. 23, 1924; PCT/US24/31912 filed on May 31, 1924; U.S. Application 63/534,213 filed on Aug. 22, 1923; U.S. Application 63/418,703 filed on Oct. 24, 1922; PCT/US24/27501 filed on May 2, 1924; PCT/US24/ 31325 filed on May 29, 1924; and U.S. Application 63/652, 616 filed on May 28, 1924.

FIELD OF THE INVENTION

This invention relates to the mechanical design of a battery cell which can withstand high ambient pressures.

BACKGROUND OF THE INVENTION

Electrochemical storage devices, such as battery cells, are used in a wide variety of applications ranging from medical devices, power tools, electric vehicles, and other consumer products. As the demand for energy and electrification continues, more applications arise that require these battery cells to operate in environments with extreme climate conditions, mainly low temperatures, and high pressures.

In climates that experience low temperatures, it is common for existing technologies, such as lithium-ion battery cells, to have decreased performance. As the climate gets colder and temperatures start to drop below 0° C., the electrolyte inside the battery cell experiences a decrease in electrochemical performance and the electrical conductivity decreases and viscosity increases until virtually no energy can be transferred. New electrolyte formulations have been developed to combat this issue by decreasing the electrolyte's freezing point to increase the battery cell's operating temperature range.

Environments that experience high ambient pressures, such as deep-sea applications under the ocean surface, pose an additional challenge to the mechanical integrity of the battery cell. The pressure under the ocean's surface increases by 1 atmosphere every 10 meters in depth. At a couple thousand meters, extremely high pressures and low temperatures are experienced. This poses a significant obstacle for deep sea applications as current battery cell technologies are unable to withstand high external pressures and experience failures as the external battery cell hardware is crushed, further damaging the internal components.

Advancements have been made to increase the depths and pressures at which today's battery cell technologies can operate by developing pressure-tolerant robust battery packs and cases which can mechanically withstand high pressures such that the battery cells only experience normal pressures (approximately one atmosphere) within the battery pack. These cases are designed using materials such as stainless steel and titanium, which are heavy, expensive, and result in further consequences of decreased efficiency and maneuverability. Even with these engineered robust designs, these battery packs and cases can only withstand pressures up to 600 bar. This limits deep sea applications to 6000 meters below the ocean's surface.

These battery packs are also often filled with insulating intermediate fluid to act as a protective barrier in translating pressure from the ambient environment (e.g. ocean water), through the intermediate fluid (e.g. oil), and to the cell. This maintains anti-corrosive properties of the oil while still maintaining low mass of the full system.

Improvements are desired to further increase the operational parameters of battery cells while maintaining efficiency, maneuverability, and electrochemical performance. Presented herein is a mechanical design for a battery cell that allows for the internal pressure inside the cell to equilibrate with the external ambient pressure. By allowing both the internal and external pressures to equilibrate around the cell, the battery cell hardware will experience a net-zero force and maintain high mechanical integrity and not suffer from a high external pressure which can crush the cell, causing premature failure through breach of cell can wall or internal short circuit. This will help to simplify the design of battery packs and cases by reducing the need for heavy metal housings around the cells and thus will reduce the cost, weight, and increase the maneuverability of the system.

SUMMARY OF THE INVENTION

Disclosed herein are mechanical designs for cells which allows the internal pressure of the cell to equilibrate with the external pressure surrounding the cell. The cell includes an integrated mechanical "pressure-equalizing member" that acts as a piston or membrane and can be configured to allow the cell to equilibrate within a specified minimum and maximum pressure range. The integrated membrane will act as an impermeable bridge that maintains contact with both the battery cell's electrolyte and the external environment. The pressure-equalizing member may be made impermeable by using a ring seal on the outer diameter of the member like a piston or may use a different seal wherein the pressure equalizing member itself is flexible and is allowed to deflect inward and outward while compressing or decompressing the electrolyte fluid. The pressure-equalizing member may also be held in place by a fixing structure.

The pressure-equalizing member will be allowed to shift inward or outward of the cell. As the pressure surrounding the cell increases, an external force will be placed upon the pressure-equalizing member. This force will push the member inward into the cell and will compress against the cell's electrolyte. Volumetric compression of the electrolyte's liquid phase will result in an increase of internal pressure within the battery cell. This can be described as applying a hydraulic pressure onto the liquid electrolyte, thus increasing pressure equally throughout all surfaces internal to the cell. Once the pressure inside the cell is equal to the external pressure, there is a net zero force on the member and the member will remain stagnant.

The mechanical design may also contain mechanical hard stops to prevent the member from shifting too far inside or outside the battery cell. These hard stops can be calibrated to a specific minimum or maximum pressure. For example, if the pressure curve for the liquefied gas electrolyte under percent compression is known, the cell may be filled with a certain volume and a hard stop be designed to stop the member when the electrolyte is compressed to a certain volume percent. Alternatively, a cell may have a certain mechanical design with a hard stop, but the electrolyte fluid is filled to a certain percent volume within the cell to allow for the member to be in a mechanical configuration allowing for maximum compression, and thus maximum ambient pressure equalization and operation. When the cell is exposed to an ambient pressure which is higher than the vapor pressure of the electrolyte solvent at the cell temperature, the member will compress the electrolyte such that there is no vapor phase of the electrolyte within the cell. The hard stop will also prevent the member from crushing the electrode assembly. While one can increase the electrolyte volume within a cell by lengthening the travel distance of the member and allowing for more compression of the electrolyte without crushing the electrode assembly, this would increase the volume and mass of the assembly. There is thus an optimal balance between mechanical design and maximum ambient pressure of the cell.

The cell may also contain a liquefied gas electrolyte. The use of a liquefied gas electrolyte allows for greater compressibility and can withstand environments with higher pressures and lower temperatures in comparison to conventional liquid electrolytes.

When the cell is exposed to an ambient pressure which is below the vapor pressure of the electrolyte at the cell temperature, the member would be in a mechanical configuration allowing for minimal compression on the liquefied gas electrolyte and there may exist both a vapor phase and liquid phase of the electrolyte solvent within the cell.

While the mechanical design disclosed is applicable to any cell design, the use of a liquefied gas electrolyte is preferred since this would maintain a fluid phase over a broader pressure and temperature range than a conventional liquid electrolyte which can freeze or show reduced conductivity at increased pressures. However, for applications requiring relatively low ambient pressures, the use of a liquid electrolyte may be preferred.

The cell has a gas-tight cell housing that encloses an electrolyte in contact with an electrode assembly. The cell housing defines a cell volume. A pressure-equalizing member is connected to the cell housing and constructed to displace a portion of the cell volume to equalize a pressure differential between an external pressure on the cell and an interior pressure of the cell. The electrolyte remains in a liquid or gas phase when the pressure-equalizing member displaces the portion of the cell volume and equalizes the pressure differential.

The electrolyte may include a solvent having a vapor pressure above 100 kPa at a temperature of 293.15 K and the solvent remains in a gas or liquid phase when the pressure-equalizing member displaces the portion of the cell volume and equalizes the pressure differential.

The pressure-equalizing member may be a piston that is slidably connected to the cell housing or a membrane connected to the cell. This may also include an O-ring seal. The O-ring and the pressure-equalizing member may be constructed, at least partially of an elastomer.

A hard stop may be used to restrict the movement of the pressure-equalizing member, thereby restricting the amount of displacement by the pressure-equalizing member on the cell volume. The pressure-equalizing member may be integrated with the hard stop. The pressure-equalizing member may move relative to the hard stop or may move with the hard stop. Multiple hard stops may be implemented including a maximum hard stop constructed to restrict the movement of the pressure-equalizing member to a position with the maximum displacement on the cell volume, and a minimum hard stop constructed to restrict the movement of the pressure-equalizing member to a position with the minimum displacement on the cell volume.

The solvent has a maximum compressive pressure before the solvent freezes and the maximum displacement by the pressure-equalizing member on the cell volume is set to impart a compressive pressure that is below the maximum compressive pressure of the solvent. A hard stop may be used to set the maximum displacement by the pressure-equalizing member (30) on the cell volume.

The pressure differential may be at least 50 bar, 100 bar, or 500 bar. The solvent may include carbon dioxide, difluoromethane, methyl fluoride, difluoroethane, ethyl fluoride, or combinations thereof. The cell may be watertight and may be a battery or capacitor.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1:
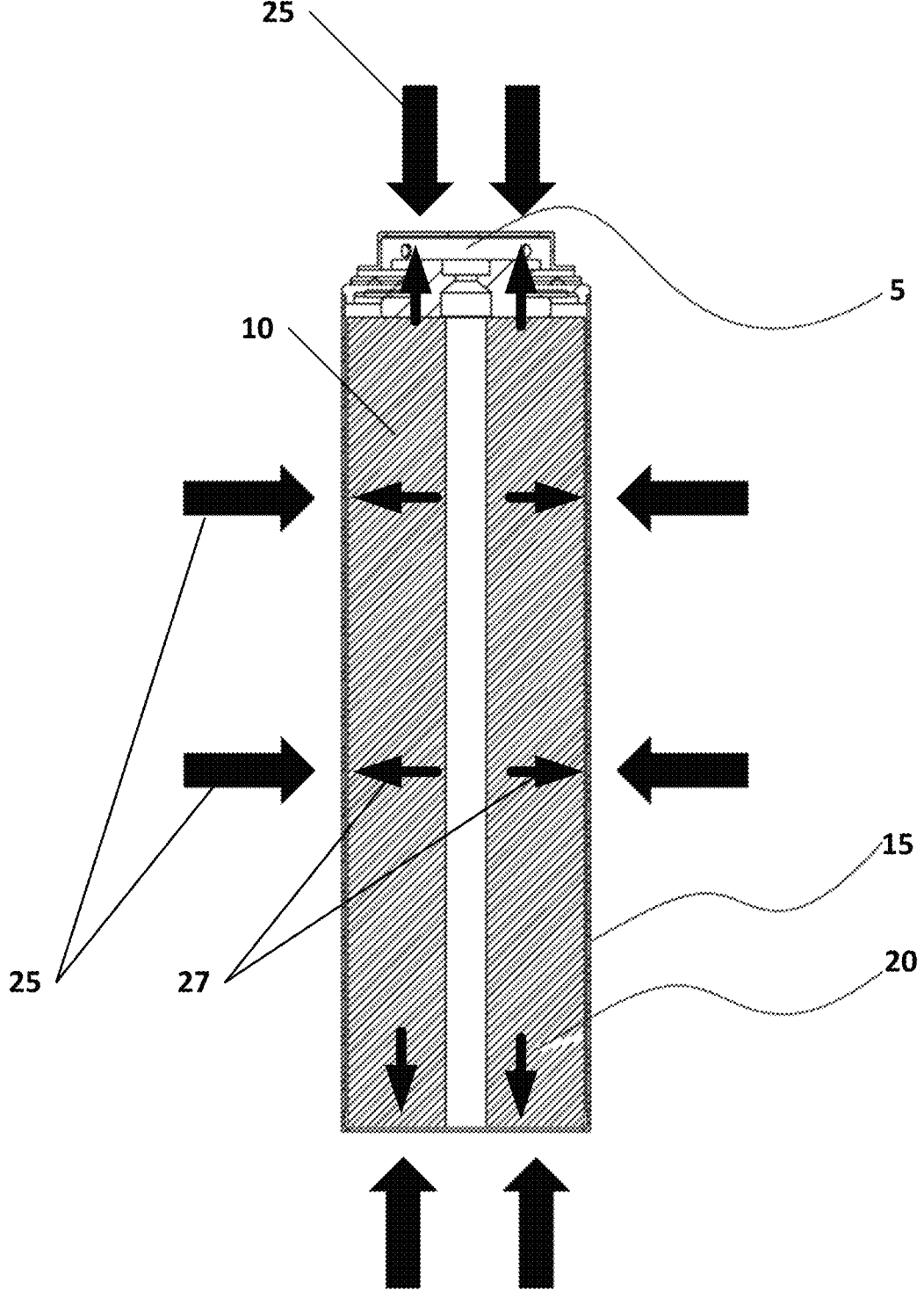
FIG. 1 illustrates the cross-section view of a standard cell under an ambient pressure greater than the internal cell pressure. In this scenario, the cell may be damaged or undergo internal short.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

5: Electrochemical Cell
10: Electrode Assembly
15: Cell Housing
17: Cell Volume
20: Electrolyte
25: External Pressure
27: Internal Cell Pressure
30: Pressure-Equalizing Member

35: Elastomer O-ring Seal
37: Pressure-Equalizing Member Volume Displacement
40A: Maximum Pressure Hard Stop
40B: Minimum Pressure Hard Stop
45: Pressure-Equalizing Member with Integrated Hard Stop
50: Flexible Pressure-Equalizing Member
55: Fixing Structure
60: Intermediate Fluid
65: Intermediate Fluid Container Today the use of battery cells in environments that experience high ambient pressures requires special pressure-tolerant battery packs and cases. These cases, constructed with rigid housings using heavy metal fixtures, are expensive, energy inefficient, and difficult to maneuver. This plays a huge role in deep sea applications. High energy density and lightweight battery cells are preferred for most applications, providing more energy storage in a smaller and lighter form factor. When it comes to powering devices in the deep sea, it is favorable to minimize power consumption when using battery power to extend its life for as long as possible since battery recovery can be a difficult and expensive process. Because of this difficulty, many battery cells and systems are left at the bottom of the ocean.

It would be beneficial to remove the need for using such heavy and energy inefficient, by allowing the battery cells within the pack to be able to withstand high ambient pressures on their own. By utilizing a pressure equalizing member, the cell can be built to withstand higher ambient pressures by equalizing the force inside and outside the cell housing.

This can be accomplished with any fluid electrolyte, by using a pressure equalizing member to apply a fluid force onto the liquid phase of the electrolyte. With a liquefied gas electrolyte, the battery cell would be able to withstand pressures as high as 100, 200, 300, 400, 500, 600, 700, 800, 900, or as high as 1,000 bar of pressure while still maintaining functionality. In contrast, utilizing this pressure equalizing member and allowing pressure equalization with today's standard liquid electrolytes would limit operation to pressures no greater than around 20 bar. This is due to the freezing point and reduced conductivity of these liquid electrolytes at low temperatures and high pressures.

It is also notable to mention that as the liquified gas is compressed, the volume of liquid inside the cell can be calculated and accounted for. This helps guide the design of the cell. For instance, if a 1 cubic centimeter volume change of the electrolyte is required to increase the internal pressure of the cell, the design of the cell should allow the equalizing membrane to compress the electrolyte a volume of 1 cubic centimeter.

An example of a cell that does not have a pressure equalizing member is shown in FIG. 1. An electrochemical cell 5 is shown with a housing 15 that contains the electrode assembly 10 and the electrolyte 20. An external pressure 25 to the electrochemical cell 15 that is greater than the internal cell pressure 27 would crush or damage the electrochemical cell 15. (note the size of the pressure arrows represents their relative magnitudes).

Figure 2A:
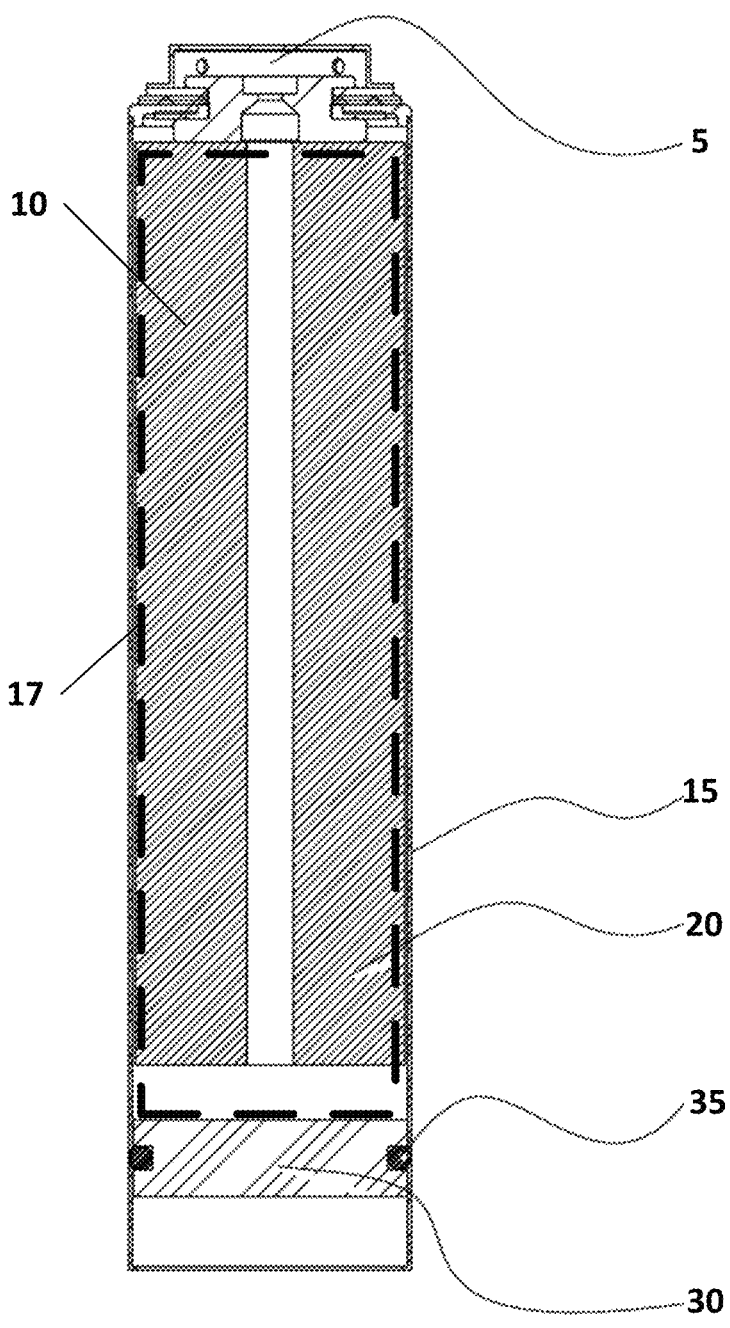
FIG. 2A illustrates the cross-sectional view of a pressure equalizing member incorporated to the bottom of a cell assembly.

An example design for the pressure-equalizing member like that of a piston can be seen in FIG. 2A.

The electrochemical cell 5 includes a gas-tight cell housing 15 enclosing an electrolyte 20 in contact with an electrode assembly 10, the cell housing 15 defining a cell volume 17. A pressure-equalizing member 30 is connected to the cell housing 15 and constructed to displace a portion of the cell volume 17 to equalize a pressure differential between an external pressure on the cell and an interior pressure of the cell 5. The electrolyte 20 remains in a gas or liquid phase when the pressure-equalizing member 30 displaces the portion of the cell volume and equalizes the pressure differential.

Figure 2D:
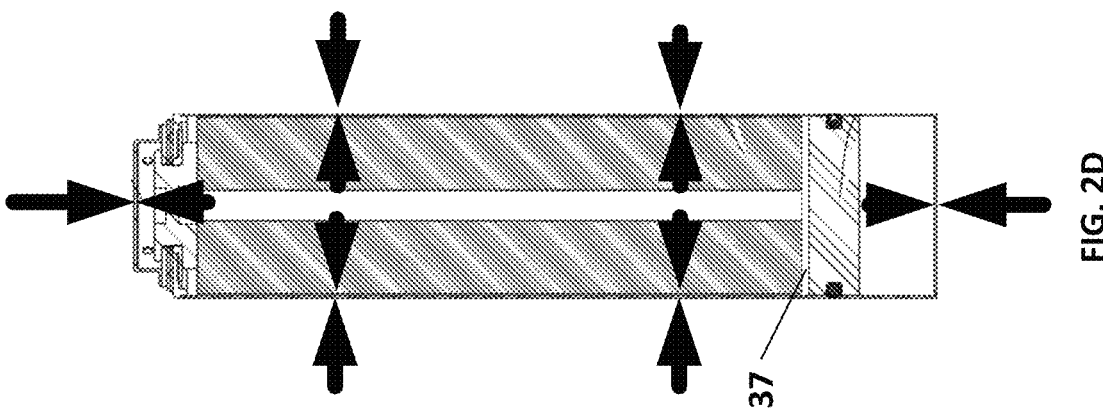
FIG. 2D illustrates the cross-sectional view of a pressure equalizing member incorporated to the bottom of a cell assembly, where the internal pressure is balanced with the external pressure.
Figure 2C:
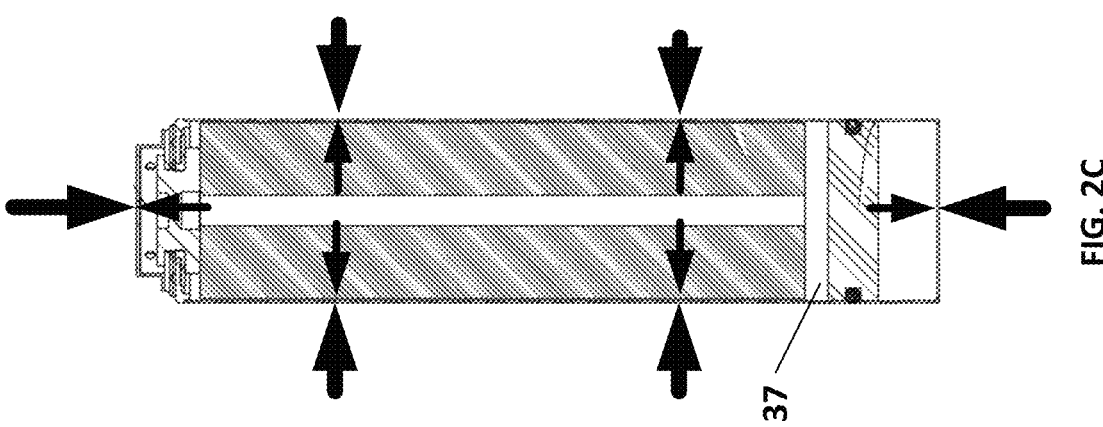
FIG. 2C illustrates the cross-sectional view of a pressure equalizing member incorporated to the bottom of a cell assembly, where the internal pressure is unbalanced with the external pressure, although less unbalanced than in FIG. 2B.
Figure 2B:
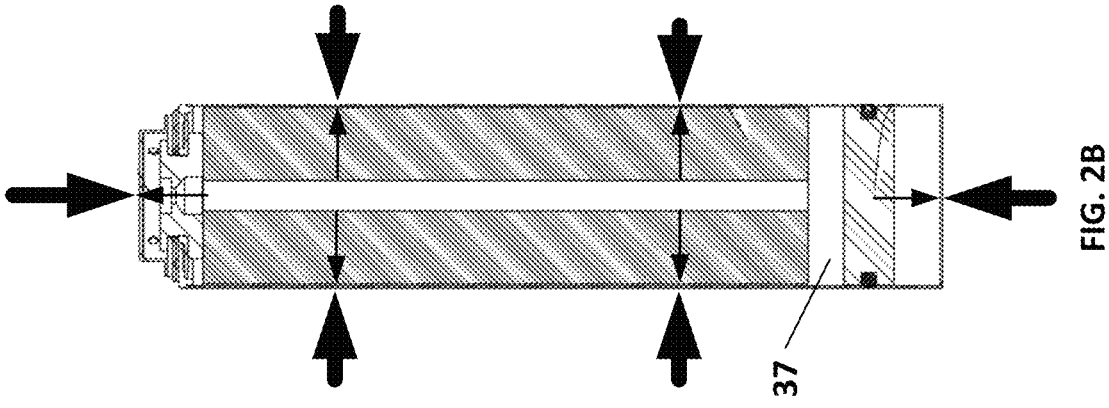
FIG. 2B illustrates the cross-sectional view of a pressure equalizing member incorporated to the bottom of a cell assembly, where the internal pressure is unbalanced with the external pressure.

The pressure-equalizing member 30 could be composed of a rigid material sealed diametrically to the cell housing with an O-ring 35 that is allowed to translate pressure into and out of the cell 5 without allowing electrolyte 20 to escape from the cell 5 or allowing any external material intrusion into the cell 5. The ambient pressure will exert a force onto the pressure-equalizing member 30 which will then displace a portion of the cell volume 17 thus compressing the electrolyte 20 until the internal cell pressure equals that of the ambient creating a net zero force. This is shown in FIGS. 2B-2D where the pressure-equalizing member creates a displacement 37 that transitions the cell from a high-pressure differential (FIG. 2B), to a moderate-pressure differential (FIG. 2C) to a substantially zero pressure differential (FIG. 2D).

The electrolyte 20 may have a solvent having a vapor pressure above 100 kPa at a temperature of 293.15 K and the solvent remains in a gas or liquid phase when the pressure-equalizing member 30 displaces the portion of the cell volume 17 and equalizes the pressure differential.

Figure 3:
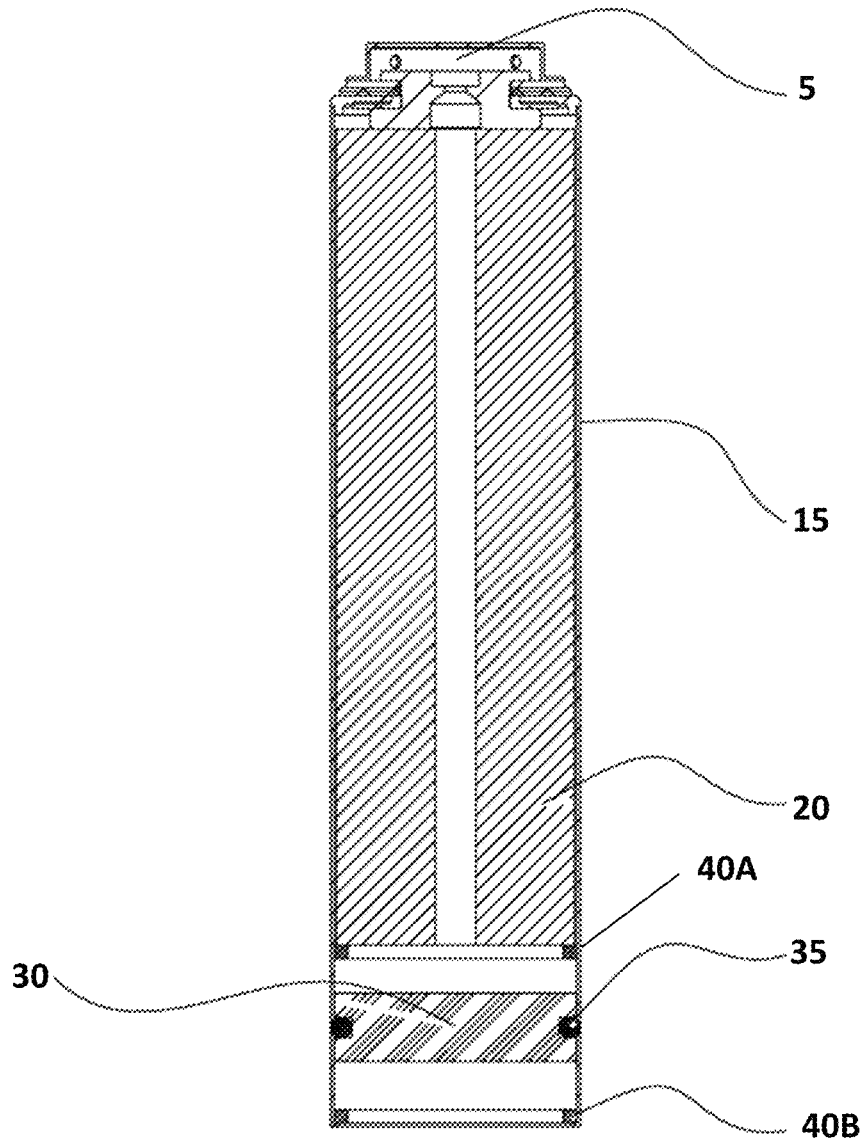
FIG. 3 illustrates the cross-sectional view of a pressure equalizing member incorporated to the bottom of a cell assembly with both minimum and maximum positioning hard stops.

To control the amount of pressure-equalizing member displacement, and therefore the amount of compression to the electrolyte a physical stop may be added. FIG. 3 illustrates a set of hard stops, a maximum pressure hard stop 40A and a minimum pressure hard stop 40B that restrict the movement of the pressure equalization member 30. In FIG. 3, the pressure-equalizing member 30 moves relative to the hard stops (40A and 40B).

Figure 4A:
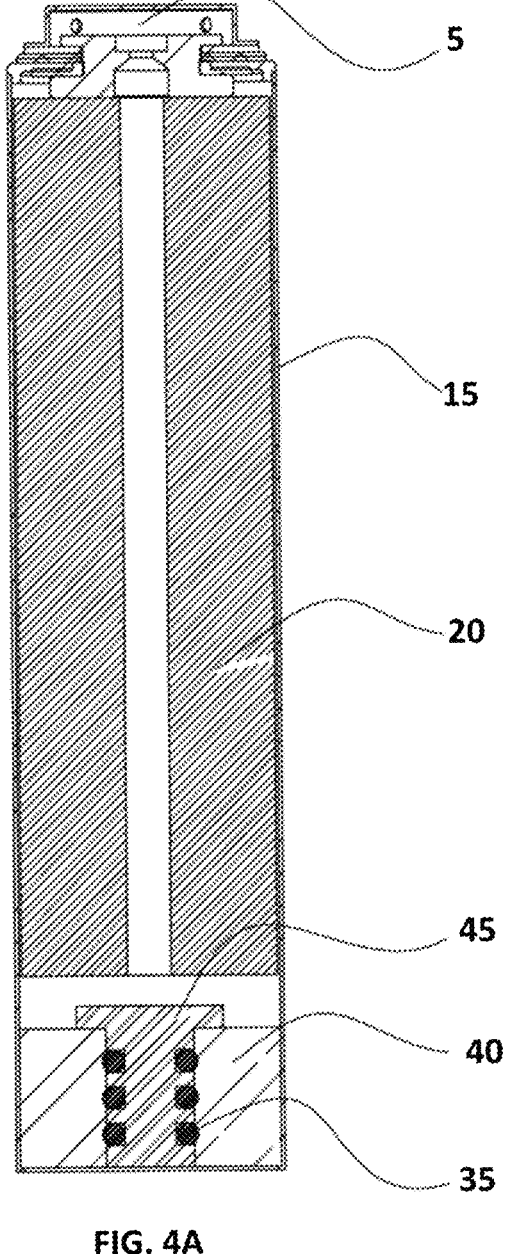
FIG. 4A illustrates the cross-sectional view of a pressure equalizing member incorporated to the bottom of a cell assembly with only a minimum positioning hard stop.
Figure 4B:
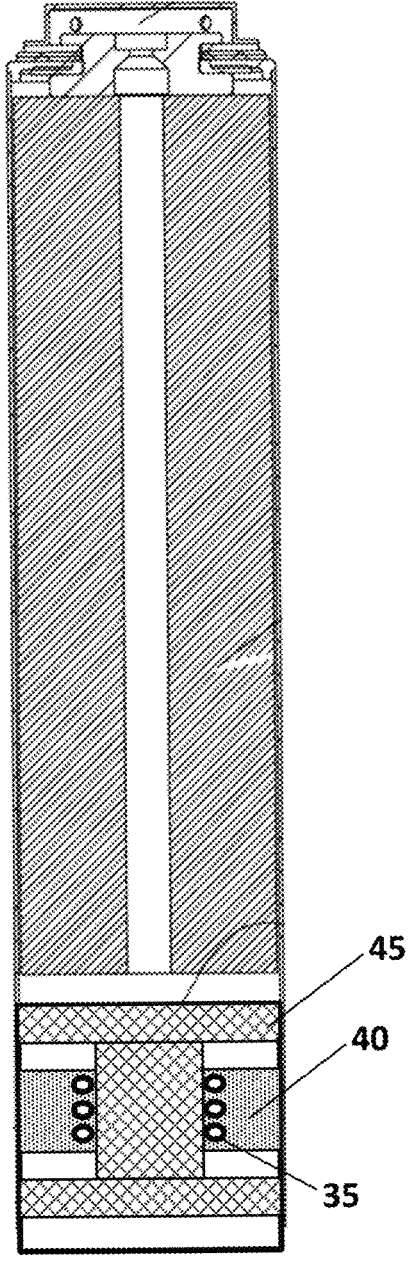
FIG. 4B illustrates the cross-sectional view of a pressure equalizing member incorporated to the bottom of a cell assembly with both a maximum and minimum positioning hard stops.

An example of using a longer and thicker piston membrane with hard stop integrated into the member itself 45 is shown in FIG. 4A. FIG. 4B illustrates a pressure-equalization member with an integrated stop 45 that restricts both for a maximum and minimum internal cell pressure. In FIGS. 4A and 4B, the pressure-equalizing member 30 moves with the hard stops (40A and 40B).

Figure 5:
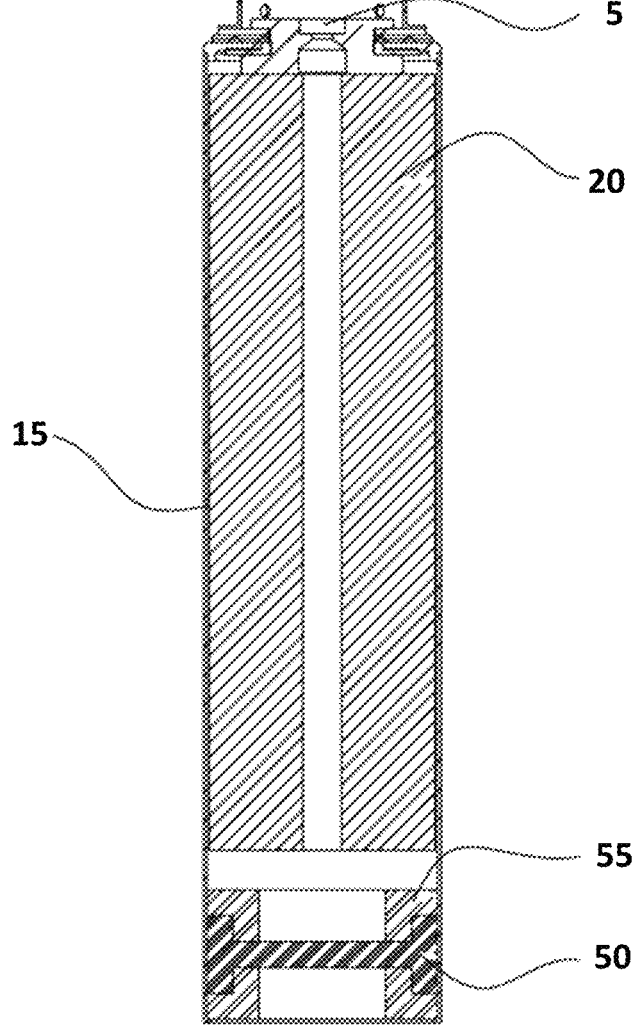
FIG. 5 is a cross-sectional view of a flexible diaphragm membrane as the pressure equalizing member.

FIG. 5 illustrates a flexible pressure-equalizing member 50 that is connected to the cell housing 15 by a fixing structure 55. As external cell pressure increases, the flexible pressure-equalizing member 50 bows compressing the electrolyte 20 to equalize the pressure differential. The pressure-equalizing member 50 may be comprised of an elastomer.

While it is possible to utilize a liquid electrolyte within the cell as an aspect of this invention, liquid electrolyte may show a less desirable freezing point under high pressures. An example of a liquid solvent's freezing point is presented in Table 1 for dimethyl carbonate (DMC) which is a common solvent used in lithium-ion batteries.

TABLE 1

| Freezing Point of LiGas and Liquid Solvents at 5° C | | |
| --- | --- | --- |
| Solvent | Pressure (Bar) | Type |
| Carbon Dioxide | 3000 | Liquefied Gas |
| Difluoromethane | 700 | Liquefied Gas |
| Methyl Fluoride | 700 | Liquefied Gas |
| Difluoroethane | 600 | Liquefied Gas |
| Ethyl Fluoride | 100 | Liquefied Gas |
| Dimethyl Carbonate | 15 | Liquid |

DMC will freeze under a low pressure of 18 bar at +5° C. This will shut down any battery cell operation. In contrast, a liquified gas solvent has a much higher tolerance to increased pressures, remaining in liquid phase and maintaining cell operation. For example, methyl fluoride (MeF) shows a freezing point at a pressure of 1,000 bar at +5° C. Thus, in using a liquefied gas electrolyte, a liquid phase with high ionic conductivity can be maintained, facilitating the battery cells operation in high ambient pressures exceeding 600 bar.

Figure 6:
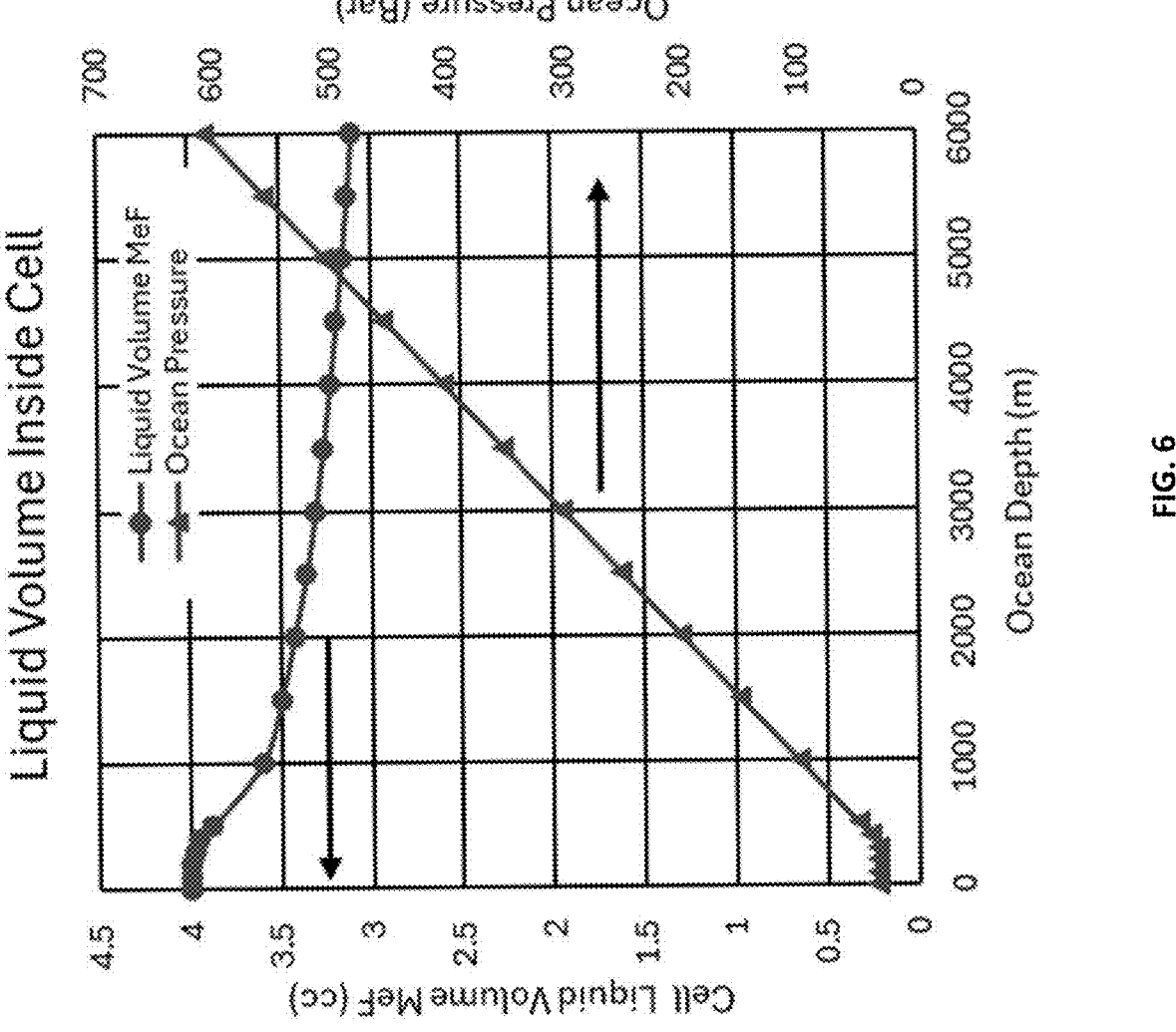
FIG. 6 is a plot depicting as a function of ocean depth (a) the pressure at that ocean depth and (b) the liquid volume of methyl fluoride with a starting liquid volume of 4 cc under its own vapor pressure at room temperature.
Figure 7:
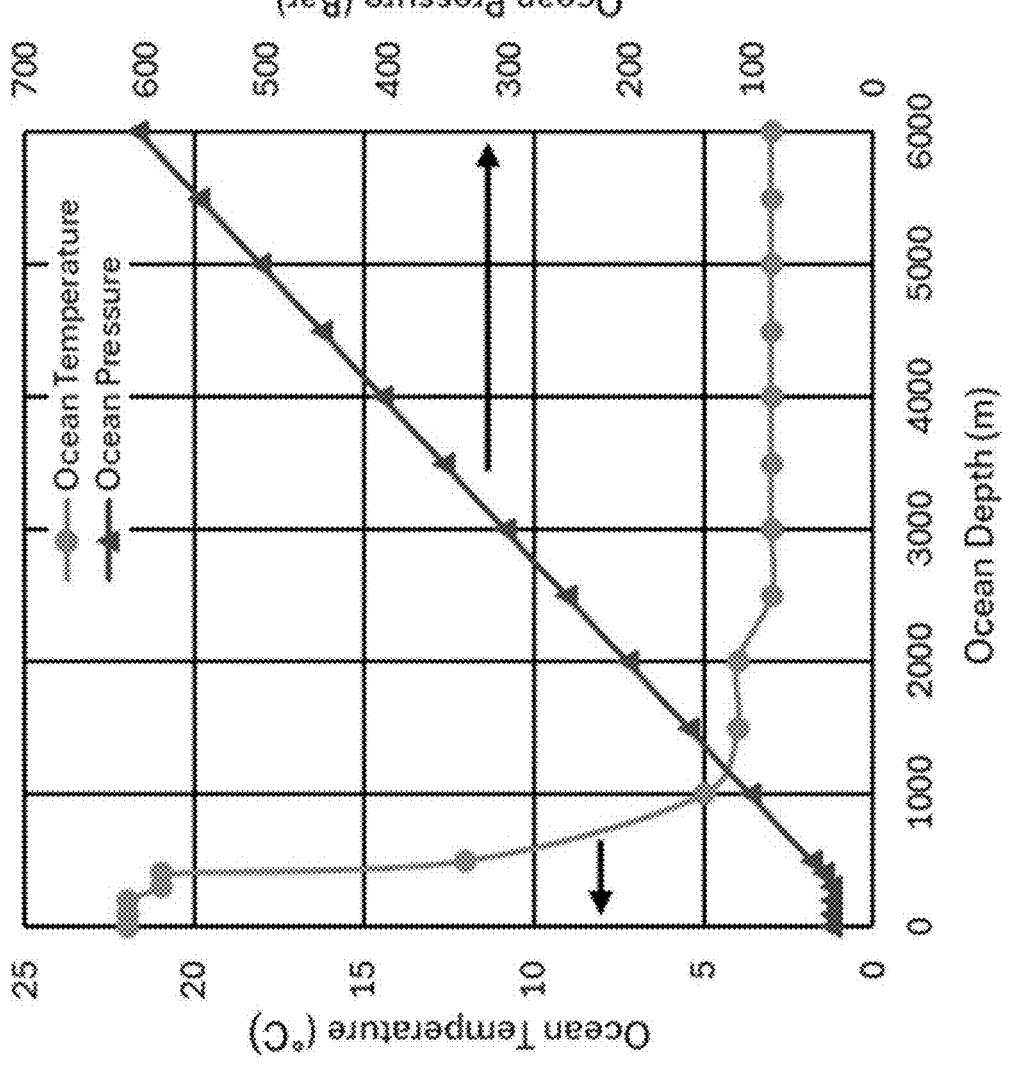
FIG. 7 is a plot showing temperature and pressure as a function of ocean depth.

An example of the liquid volume change of MeF under compression is shown in FIG. 6. With a starting initial liquid volume of 4 cubic centimeters of MeF, at ocean depths of 6,000 meters and pressures of 600 bar, the liquid volume will be reduced by 1 cubic centimeter. Thus, a mechanical design of a cell made be constructed such that the pressure equalizing member displaces 1 cubic centimeter to maintain a high internal pressure which equalizes the external pressure and resulting in a net zero force on the cell housing. This maximum pressure may be limited by a hard stop as discussed above. FIG. 7 illustrates the ocean temperature and pressures at various depths.

Figure 8:
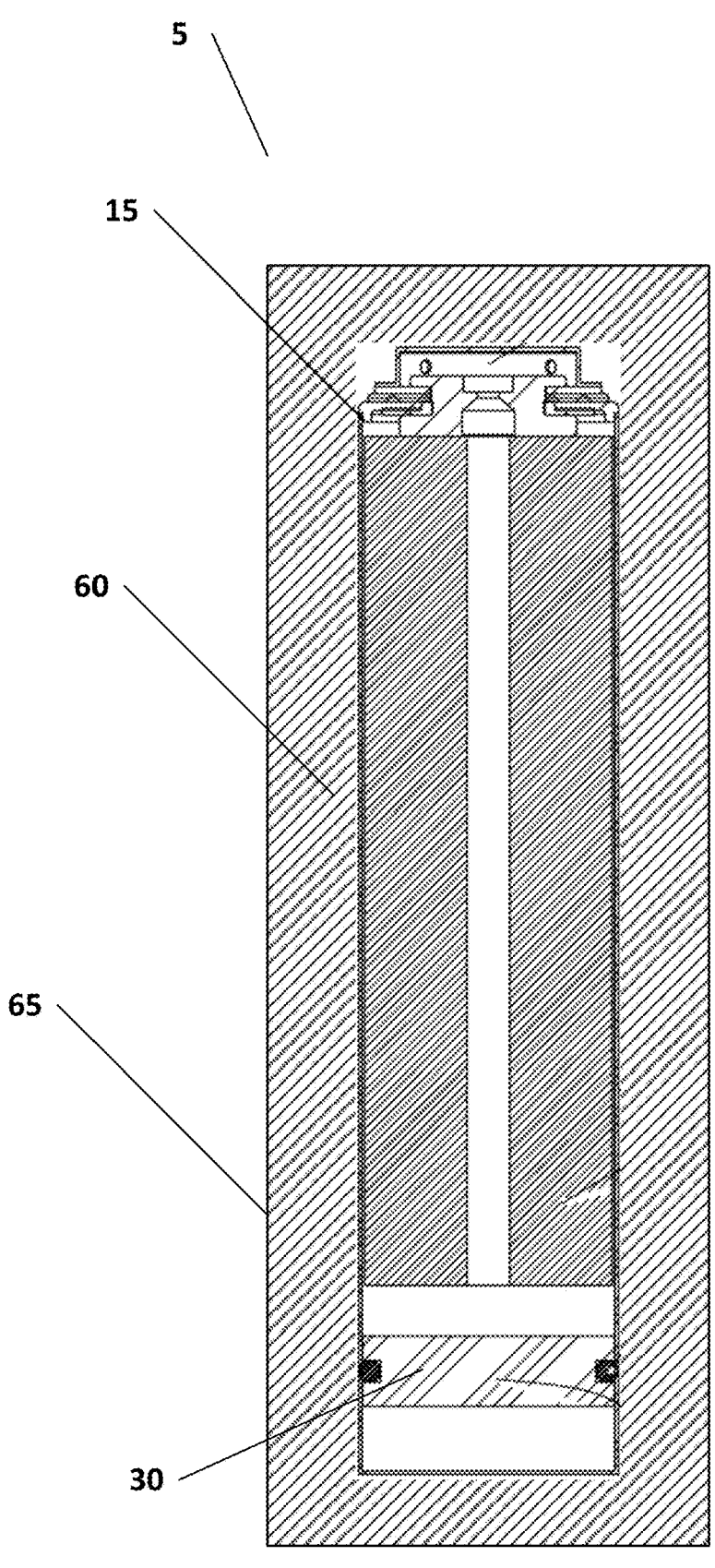
FIG. 8 illustrates a high-pressure cell submerged in an intermediate fluid.

As shown in FIG. 8, these pressure-tolerant cells are also often submerged into a container 65 containing an intermediate fluid 60 which helps translate the external ambient pressure (e.g. ocean pressure at depth) through the intermediate fluid 60 (e.g. oil) and to the cell. This maintains anti-corrosive properties of the oil while still maintaining low mass of the full system. The intermediate fluid 60 should also be electrically and ionically insulating to prevent cell-to-cell short within the battery pack containing the pressure tolerant cells. The intermediate fluid 60 can also use a fluid which is ordinarily a gas at room temperature and atmospheric pressure, but under high pressure may be liquefied and used as a fluid intermediate medium. An example of this can be butane, which is similar to oil in that it is a hydrocarbon, but will maintain low viscosity under high ambient pressures, thus translating pressures well and equalizing forces to the battery cells uniformly. Other examples are hydrocarbons which are liquid under standard conditions such as mineral oil. Non-flammable examples also include fluorocarbon liquids.

While this document contains many specifics, these should not be construed as limitations on the scope of any invention or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An electrochemical cell (5) comprising:

a gas-tight cell housing (15) enclosing an electrolyte (20) in contact with an electrode assembly (10), the cell housing (15) defining a cell volume (17) and enclosing a solvent having a vapor pressure above 100 kPa at a temperature of 293.15 K;

a pressure-equalizing member (30) connected to the cell housing (15) and constructed to simultaneously (1) displace (37) a portion of the cell volume (17) to equalize a pressure differential between an external pressure on the electrochemical cell (5) and an interior pressure of the electrochemical cell (5), and (2) maintain a gas-tight seal, wherein the pressure differential exists due to the external pressure on the electrochemical cell (5) being greater than the interior pressure of the electrochemical cell (5);

wherein the electrolyte (20) remains in a liquid phase when the pressure-equalizing member (30) displaces (37) the portion of the cell volume (17) and equalizes the pressure differential; and wherein the solvent remains in a gas or liquid phase when the pressure-equalizing member (30) displaces (37) the portion of the cell volume (17) and equalizes the pressure differential.

2. The electrochemical cell (5) of claim 1, wherein the pressure-equalizing member (30) comprises a piston that is slidably connected to the cell housing (15).

3. The electrochemical cell (5) of claim 2, wherein the pressure-equalizing member (30) comprises an O-ring seal (35).

4. The electrochemical cell (5) of claim 2, further comprising:

a hard stop (40A, 40B, 45) constructed to restrict the movement of the pressure-equalizing member (30), thereby restricting the amount of displacement (37) by the pressure-equalizing member (30) on the cell volume (17).

5. The electrochemical cell (5) of claim 4, wherein the pressure-equalizing member is integrated with the hard stop (45).

6. The electrochemical cell (5) of claim 4, wherein the pressure-equalizing member (30) moves relative to the hard stop (40A, 40B).

7. The electrochemical cell (5) of claim 4, wherein the pressure-equalizing member moves with the hard stop (45).

8. The electrochemical cell (5) of claim 4 further comprising:

a maximum hard stop (40A) constructed to restrict the movement of the pressure-equalizing member (30) to a position with the maximum displacement (37) on the cell volume (17); and a minimum hard stop (40B) constructed to restrict the movement of the pressure-equalizing member (30) to a position with the minimum displacement (37) on the cell volume (17).

9. The electrochemical cell (5) of claim 1, wherein the pressure-equalizing member (30) comprises a flexible membrane (50) connected to the cell housing (15).

10. The electrochemical cell (5) of claim 1, wherein the pressure-equalizing member (30) comprises an elastomer.

11. The electrochemical cell (5) of claim 1, wherein: the cell housing (15) is cylindrical and the pressure-equalizing member (30) is positioned at a bottom of the cell housing (15).

12. The electrochemical cell (5) of claim 1, wherein:

the solvent of claim 1 has a maximum compressive pressure before the solvent freezes; and the maximum displacement (37) by the pressure-equalizing member (30) on the cell volume (17) is set to impart a compressive pressure that is below the maximum compressive pressure of the solvent.

13. The electrochemical cell (5) of claim 12, further comprising a hard stop (40A, 40B, 45) that sets the maximum displacement (37) by the pressure-equalizing member (30) on the cell volume (17).

14. The electrochemical cell (5) of claim 1, wherein the pressure differential is at least 100 bar.

15. The electrochemical cell (5) of claim 1, wherein the pressure differential is at least 500 bar.

16. The electrochemical cell (5) of claim 1, wherein the solvent of the electrochemical cell further comprises one or more of: carbon dioxide, difluoromethane, methyl fluoride, difluoroethane, ethyl fluoride, or combinations thereof.

17. The electrochemical cell (5) of claim 1, wherein the cell housing (15) is watertight.

18. The electrochemical cell (5) of claim 1, wherein the cell (5) is a battery or capacitor.

19. The electrochemical cell (5) of claim 1, further comprising an intermediate fluid container (65) containing an intermediate fluid (60), wherein the cell housing (15) and the pressure-equalizing member (30) are submerged in the intermediate fluid (60).

20. The electrochemical cell (5) of claim 19, wherein the intermediate fluid is electrically and ionically insulating.

21. The electrochemical cell (5) of claim 19, wherein the intermediate fluid is a liquefied gas.

22. The electrochemical cell (5) of claim 19, wherein the intermediate fluid comprises a hydrocarbon or a fluorocarbon.

* * * * *